US009900919B1

(12) United States Patent
Butler et al.

(10) Patent No.: US 9,900,919 B1
(45) Date of Patent: Feb. 20, 2018

(54) ADAPTIVE BEACON RATE SYSTEM

(71) Applicant: AMAZON TECHNOLOGIES, INC., Reno, NV (US)

(72) Inventors: David George Butler, San Jose, CA (US); Richard William Mincher, Cupertino, CA (US); Yi Zhu, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 211 days.

(21) Appl. No.: 14/219,757

(22) Filed: Mar. 19, 2014

(51) Int. Cl.
H04W 76/02 (2009.01)
H04W 48/16 (2009.01)
H04W 8/00 (2009.01)
H04W 52/02 (2009.01)
H04W 12/06 (2009.01)

(52) U.S. Cl.
CPC ......... *H04W 76/021* (2013.01); *H04W 8/005* (2013.01); *H04W 12/06* (2013.01); *H04W 48/16* (2013.01); *H04W 52/0229* (2013.01)

(58) Field of Classification Search
None
See application file for complete search history.

(56) References Cited

U.S. PATENT DOCUMENTS

| 9,113,776 B2* | 8/2015 | Connor | G06F 19/327 |
| 2006/0251098 A1* | 11/2006 | Morioka | H04W 84/18 370/432 |
| 2010/0202422 A1* | 8/2010 | Govindan | H04W 88/04 370/338 |
| 2011/0189958 A1* | 8/2011 | Goto | H04W 84/20 455/62 |
| 2013/0024685 A1* | 1/2013 | Kolavennu | H04L 41/0806 713/153 |
| 2013/0081113 A1* | 3/2013 | Cherian | G06F 15/177 726/4 |
| 2013/0201866 A1* | 8/2013 | Wentink | H04W 76/027 370/253 |
| 2014/0028817 A1* | 1/2014 | Brockway, III | H04N 5/23206 348/61 |
| 2014/0254577 A1* | 9/2014 | Wright | H04W 12/04 370/338 |
| 2014/0269463 A1* | 9/2014 | Miryala | H04W 48/12 370/311 |

(Continued)

*Primary Examiner* — Yaotang Wang
(74) *Attorney, Agent, or Firm* — Lindauer Law, PLLC

(57) ABSTRACT

A first device is activated and transmits wireless beacon frames. The first device acts as an access point to a temporary wireless network, while the beacon frame invites a second device to connect thereto. The beacon frame may be sent at various rates or intervals in the interest of expeditious discovery or contact, conservation of battery-based energy resources, or according to other goals. The second device may respond to the beacon, and accepted by the first device for connection to the temporary wireless network. The second device may then provide network access credentials corresponding to an established network. The first device may then switch to a station mode and connects to the established wireless network by way established corresponding wireless access point. The temporary wireless network may be terminated after the first device successfully connects to the established wireless network.

19 Claims, 9 Drawing Sheets

(56) References Cited

U.S. PATENT DOCUMENTS

| | | | | |
|---|---|---|---|---|
| 2014/0380443 A1* | 12/2014 | Stark | ............... | H04W 12/08 726/7 |
| 2015/0097689 A1* | 4/2015 | Logue | ............... | G08B 25/10 340/632 |
| 2015/0117288 A1* | 4/2015 | Park | ............... | H04W 52/0206 370/311 |

* cited by examiner

ADAPTIVE BEACON RATE SYSTEM

BACKGROUND

Tablet computers, wearable computers, smart phones, media devices, sensors, mass storage units, and other devices may operate as respective nodes within a network-of-things. Methods and apparatus for adding devices to, or managing devices within, such as network are continually sought after.

Figure 1:
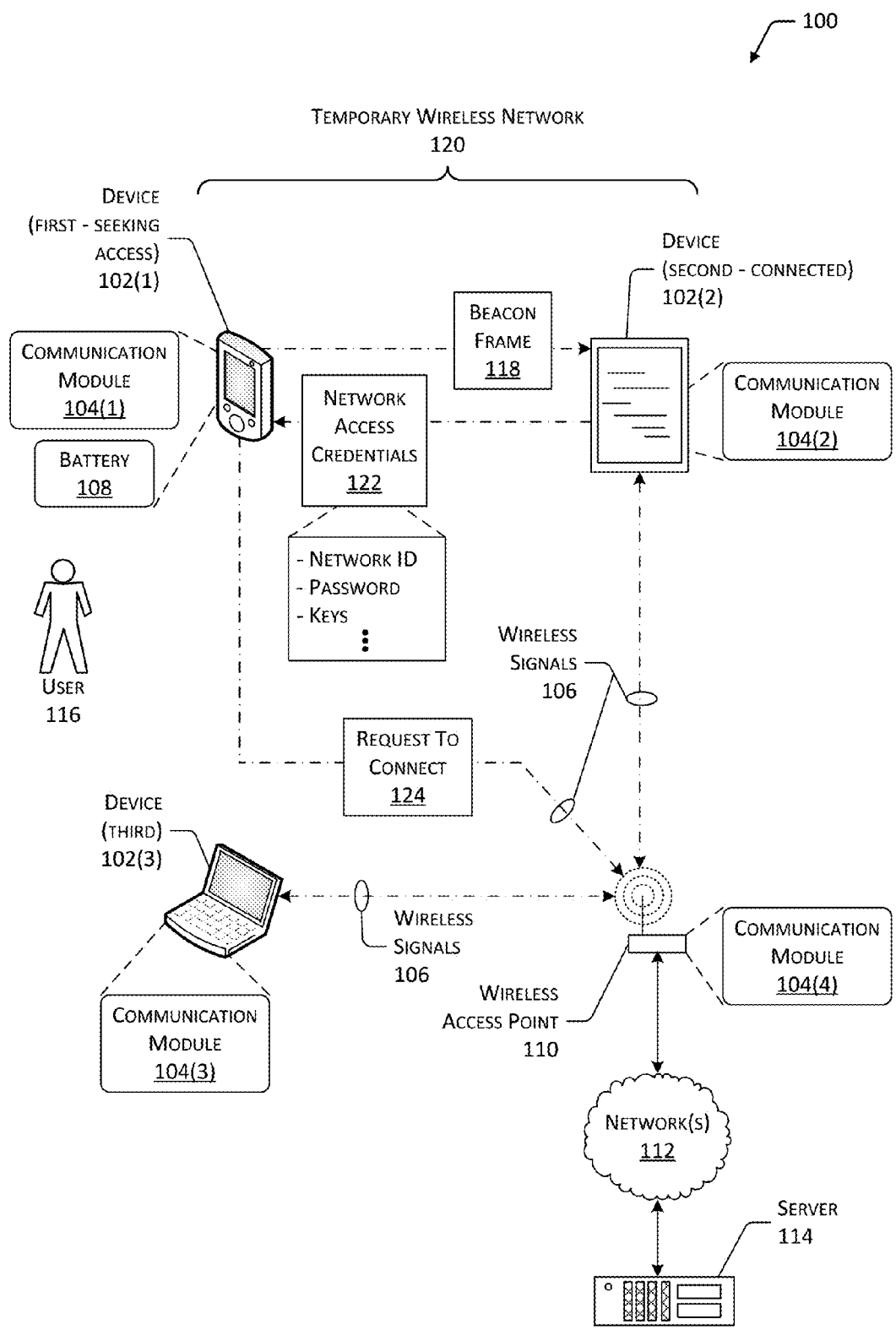
FIG. 1 depicts views including connecting a new device to an established wireless network having other devices.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Many different devices are used in diverse areas of endeavor. Smart phones, tablet computers, wearable computers having eyewear- or wristwatch-like form factors, media access or viewing devices, e-book readers, mass data storage devices, wireless access points, and so on, are just a few examples. Such devices perform various respective functions and may be connected using a wireless network. Devices in this wireless network may operate as access points or stations. The stations in the wireless network connect to the access points. The access points, in turn, provide connectivity between the stations, other access points, or to a network.

Some devices are battery powered, drawing energy from a relatively limited reserve. Certain operations may be power-intensive, such as wireless transmission of data. Other devices may have relatively simple user interfaces, limited to indicating lights or pushbuttons, such that detailed information or instructions cannot be presented to a user. These and other characteristics may be adequate during normal operations, but may present considerable challenges while attempting to connect such a device to a wireless network.

For example, a user may purchase a media device to be used for storing digital photographs, video files, or other data that are communicated to and from the device by way of wireless signals. The media device may have LEDs indicating a power-on state, an active data reading or writing operation, and so forth, but is lacking a display or screen configured to present information in a textual or graphical manner. Thus, the media device is not equipped to present detailed guidance to the user when attempting to connect the device to a wireless network, or during other operations requiring user involvement. Such a media device may be referred to as a "headless" device, by virtue of its simplistic user interface.

In another example, a user may acquire a new portable device, such as a smartphone, and wish to connect the smartphone to their home wireless network. In this case, the smartphone has a robust display such that text and images may be presented to aid the user during network configuration or other processes. However, the smartphone is battery powered and it is desirable to connect the smartphone to the home wireless network as quickly as possible, so that excessive battery-based energy is not wasted during the connection process. Other situations presenting other concerns may also be considered.

It is advantageous to expedite the discovery and addition of these devices to the wireless network to improve the user experience by avoiding delays and also to reduce power consumption in the user device. One illustrative operation is as follows: a user purchases a new device, such as an e-book reader, which is battery powered and includes wireless communications capabilities provided by a communication interface. The user seeks to connect the e-book reader to an established wireless network. The user activates the e-book reader, which performs a startup process. Thereafter, the e-book reader uses a communication interface send a beacon frame that includes an identifier for a temporary wireless network. The beacon frame is transmitted at intervals that vary in accordance with a predetermined scheme which may be configured to reduce discovery time. Thus, the e-book reader transmits the wireless beacon frame in an attempt to connect with another device that is already connected to the established wireless network.

A beacon frame may be sent repeatedly according to a relatively rapid rate, such as once every half second, over a period of time such as two minutes. The rapid rate of beacon frame transmission is performed to prompt discovery by another device, which may respond thereto. For example, with the rapid rate described, the other device in receiving range will receive the beacon frame at most a half second after beaconing begins.

The beacon frame may also be sent at a relatively slow rate, such as once every three seconds for a period of time. Discovery by the other device will be at most three seconds in this example, longer than with the rapid rate, but energy drawn from a battery or other resource may be conserved relative to the rapid rate, extending operational life given the power available in the battery or other resource.

The beacon frame may be transmitted at increasing or time-varying intervals, such that a balance is struck between rapid discovery and energy conservation. For example, the beacon rate may begin at a rapid rate to facilitate quick discovery by other devices, then taper off to a slower rate which converses battery power while still allowing discovery (albeit more slowly) by other devices. Other beacon frame rates in accordance with other goals may also be used.

A laptop computer receives the beacon frame sent from the e-book reader and uses the identifier to send a wireless response. Specifically, the laptop computer connects with the e-book reader by way of the temporary wireless network. The e-book reader may then request that the laptop computer provide network access credentials corresponding to the established wireless network. Data such as a user authorization name or code, a security token, or other information may also be included in the request. The e-book reader may discontinue, or significantly reduce the transmission rate of, the beacon frame in response to connecting with the laptop computer such that battery-based energy is conserved.

Continuing the present example, the laptop computer may respond by sending the requested network access credentials to the e-book reader, by way of the temporary network. The e-book reader may then acknowledge receipt of the network access credentials. The network access credentials may include any suitable data or information, such as a band or channel, a network identifier, one or more passwords or security tokens, one or more encryption keys, or other access- or security-related information.

The e-book reader may then use the information provided by way of the network access credentials to communicate with a wireless access point, requesting connection to the established wireless network. The wireless access point may verify various aspects of the network access credentials, and then connect the e-book reader to the established wireless network. Successful connection to the established wireless network may be communicated to the e-book reader, which may in turn communicate the newly-connected status to the laptop computer. The e-book reader may then discontinue operation of the temporary wireless network. The e-book reader, the laptop computer, or numerous other devices may now access the Internet or other resources, communicate with each other, and so on, by way of the established wireless network.

In the foregoing illustration, there was little user involvement in the network connection process, aside from activating the e-book reader for the first time within operable proximity of the established wireless network. In another instance, the user may request to authorize an otherwise automated wireless network connection process by way of a message or other presentation on a display of the new device. In yet another instance, the wireless network connection process is triggered by a specific user input to the new device, such as the pressing or holding of a particular button on a headless device.

Selection of a wireless channel or band for use in sending the beacon frame may be made accordance with an assessment of selection criteria which are indicative of wireless activity. In one instance, a device monitors a plurality of predefined wireless channels and measures values associated with the selection criteria. The selection criteria may include one or more of: signal strength of various wireless messages being transmitted over those channels, a count of the number of unique devices communicating, quantity of traffic exchanged, and so forth. The channel having the selection criteria with a greatest value is then selected for use in sending the beacon frame.

In some situations it may be assumed that the established wireless network to which the device will be connected is one which is already in use. For example, it may be assumed that the established wireless network has numerous devices which are communicating with one another on a given channel. Changing the wireless channel in use by the radio of the device involves a delay during which the radio is unavailable. For example, a radio frequency circuit of a wireless communication interface may require several seconds to change from channel 1 to channel 6 and settle into operation on channel 6. These delays may impact data transfer. By selecting the wireless channel or band for use which is determined to have the greatest wireless signal strength, the device is able to more quickly transfer between connections on two different wireless networks. The ability to quickly transfer between wireless networks which coexist in the same band or channel facilitates testing of the network access credentials, beacon frame transmission, and so forth.

These and other operations or techniques may be used to connect a new device to a wireless network in an expeditious or energy-efficient manner. By varying the rate at which beacon frames are sent the amount of time spent to discover and configured devices may be reduced, power consumption may be reduced, and so forth. By selecting a wireless channel which is "busiest" for use, rather than selecting an unused channel, time spent by the device to receive and test network access credentials may also be reduced. By reducing these times, the overall user experience may be improved.

Illustrative System

FIG. 1 depicts views 100 of a system including particular elements and operations performed by each. The views 100 are illustrative and non-limiting in nature, and other elements, devices, systems, or respective operations are also contemplated.

A first device 102(1) is depicted as a smartphone having a portable form factor, and configured to perform various functions in accordance with a computer-executable program code. Other device 102 types or configurations, such as e-book readers, wearable computers, laptop computers, storage devices, digital cameras, and so forth, may also be used. The first device 102(1) includes a communication module 104(1) configured to send and receive data or information by way of wireless signals 106. The wireless signals 106 may be formatted or operate on respective channels in accordance with the Institute of Electrical and Electronic Engineers (IEEE) standards 802.11. For instance, signaling protocols such as Wi-Fi or Bluetooth may be used. Wi-Fi is a registered trademark owned by Wi-Fi Alliance, Austin, Tex., USA. Bluetooth is a registered trademark owned by Bluetooth SIG, Inc., Kirkland, Wash., USA. Other wireless signaling protocols may also be used.

The communication module 104(1) may include radio frequency (RF) circuitry, a processor, or other suitable constituency. Alternatively, the communication module 104(1) may access or control an RF circuit that performs other functions on behalf of the first device 102(1). In turn, the first device 102(1) may include a battery 108 configured to provide operating power to various resources of the first device 102(1). In one example, the battery 108 is a rechargeable type such as lithium-ion (Li-ion) or another suitable variety. Other energy storage devices may also be used with the first device 102(1).

A second device 102(2) is also depicted as a tablet computer, and is configured to perform various functions in accordance with computer-executable program code. The second device 102(2) includes a communication module 104(2), and is configured to communicate with other devices 102 by way of wireless signals 106. A third device 102(3) is also depicted as a laptop computer, and includes a communication module 104(3) configured to communicate by way of wireless signals 106.

Also depicted is a wireless access point 110 that includes a communication module 104(4). The wireless access point 110 is configured to facilitate the exchange of data or information between the second device 102(2) and the third device 102(3), couple either of the devices 102(2) or 102(3)

with one or more networks 112 or a server 114, or perform other communications-related functions. The wireless access point 110 thus defines a hub or centralized node for a wireless network-of-things, of which the second device 102(2) and the third device 102(3) are respective elements or nodes. Such a wireless network may be used within home, office setting, commercial space, or other environment.

Thus, the devices 102(2) and 102(3) may communicate with each other, access the one or more networks 112 or the server 114, access the Internet or other resources, and so on, using wireless signals 106 communicated by way of the wireless access point 110. The wireless access point 110 may operate on one or more RF channels or at respective signal strengths, format or encrypt information in particular ways, or perform other operations according to a particular wireless protocol such as Wi-Fi or Bluetooth. The wireless access point 110 may also encrypt data or information in accordance with one or more encryption keys, require one or more passwords for access thereto, and so forth, in the interest of security.

One illustrative operation may be performed as follows: a user 116 purchases the first device 102(1) and wishes to add it to the established wireless network. That is, the user 116 seeks to wirelessly connect the first device 102(1) to the wireless access point 110. The user 116 then brings the first device 102(1) within RF signal range of the wireless access point 110 and activates the first device 102(1).

The communication module 104(1) of the first device 102(1) thereafter assumes an access point (AP) mode of operation, and begins sending a beacon frame 118 by way of wireless signals 106. The beacon frame 118 may be formatted in accordance with Wi-Fi or another protocol, and may include an identifier for a temporary wireless network 120. The beacon frame 118 may include other information or data as well, such as a name or identifier for the first device 102(1), a name or identifier for the user 116, and so on. The beacon frame 118 may thus be a packet of information that is broadcast wirelessly at intervals according to a first rate, with periods of RF "silence" in between respective transmissions. In another instance, the beacon frame 118 may be sent by optical or light wave communication, by acoustic signaling, or by way of another technique.

The communication module 104(1) may format the beacon frame 118 and include information therein so as to invite a receiving device 102 to establish a connection with the first device 102(1). Thus, the first device 102(1) appears as another access point to any device or devices 102 that may receive the beacon frame 118. The beacon frame 118 may include a request for access to another network, or may omit such a request in the interest of conserving battery 108 energy reserves or for other purposes.

Continuing the present example, the second device 102(2) receives the beacon frame 118 and establishes communication with the first device 102(1), such that the temporary wireless network 120 is defined. The second device 102(2) also communicates network access credentials 122 to the first device 102(1) in response to a request included with the beacon frame 118. In another instance, the first device 102(1) may issue such a request to the second device 102(2) after the temporary wireless network 120 is established.

The network access credentials 122 may include a network identifier corresponding to the wireless access point 110, an indication of a channel or channels being used, a password or passwords, one or more encryption keys, or other data as needed to establish contact with the wireless access point 110. Other information or data may also be included with the network access credentials 122.

The first device 102(1) may then send an acknowledgement of receipt of the network access credentials 122 to the second device 102(2), by way of the temporary wireless network 120. The first device 102(1) may also discontinue sending the beacon frame 118, reduce or otherwise change the rate at which the beacon frame 118 is sent, change information or data included with the beacon frame 118, and so on.

As such, each of the sent beacon frames 118 may include the same service set identifier (SSID) or another identifier, the same header, or other content in common. However, the respective same beacon frames 118 may also include different time stamps, different times giving notice of transmission of the next beacon frame 118 in a sequence, and so on. As used herein, respective beacon frames 118 are considered the same by virtue of a common SSID, header, reference to a particular access point, or other commonality, while other content of such respective beacon frames 118 may vary.

In the present example, the communication module 104(1) of the first device 102(1) may use the network access credentials 122 to send a request to connect 124 to the wireless access point 110. The wireless access point 110 may respond by verifying the network access credentials 122 or selected aspects thereof, and if such are found valid, connect the first device 102(1) to the established network. The communication module 104(1) may now assume a station mode of operation, wirelessly communicating with the second device 102(2) or the third device 102(3), accessing the network(s) 112 or the server 114, and so on, by way of the wireless access point 110. Thus, the first device 102(1) has been added to the existing network-of-things and may perform various operations or access other resources accordingly.

A device 102 which is in a station mode, or which is acting as a station, is able to connect to an access point and act as a client to that access point. While in the station mode, the device may be unable to accept connections from devices which are not access points. Thus, a device 102 operating in station mode has activated electronic circuitry or other physical resources, is running program code, or both, enabling it to operate as a client or node within a wireless network, while connected to a wireless access point.

Continuing the present example, the first device 102(1) may now significantly curtail or discontinue sending the beacon frame 118. The first device 102(1) may also communicate a message to the second device 102(2) indicative of the successful connection to the wireless access point 110—that is, connection to the established wireless network. Furthermore, the first device 102(1) may also terminate operation of the temporary wireless network 120, having optionally informed the second device 102(2) of the discontinuance in advance. Other operations may also be performed.

In one instance, a device 102 may have resources or a configuration enabling it to maintain two or more wireless network connections simultaneously. For example, the first device 102(1) may be able to maintain a connection to the second device 102(2) using the temporary wireless network 120, while simultaneously maintaining a connection to the wireless access point 110 of the established wireless network. That is, the first device 102(1) may have two or more Wi-Fi components that may be operated independently. Thus, such a first device 102(1) may operate in an access point mode and a station mode contemporaneously. Additionally, a device 102 may be resourced or configured to maintain these two or more connections using one or more different wireless channels or bands simultaneously.

In another instance, a device 102 may have only sufficient resources or a configuration to maintain one wireless network connection at a time, or using only a single wireless channel or band at one time. For example, the first device 102(1) may have only a single Wi-Fi chip, and therefore switches or toggles between an access point mode for connection in the temporary wireless network 120, and a station mode for connection to in the established wireless network. Such toggling between distinct modes may be performed in any suitable time frame, as needed, or may be performed with sufficient rapidity as to approximate bimodal operation. Other singular or multi-modal operations may be performed in accordance with existing or future developments in wireless technology.

Figure 2:
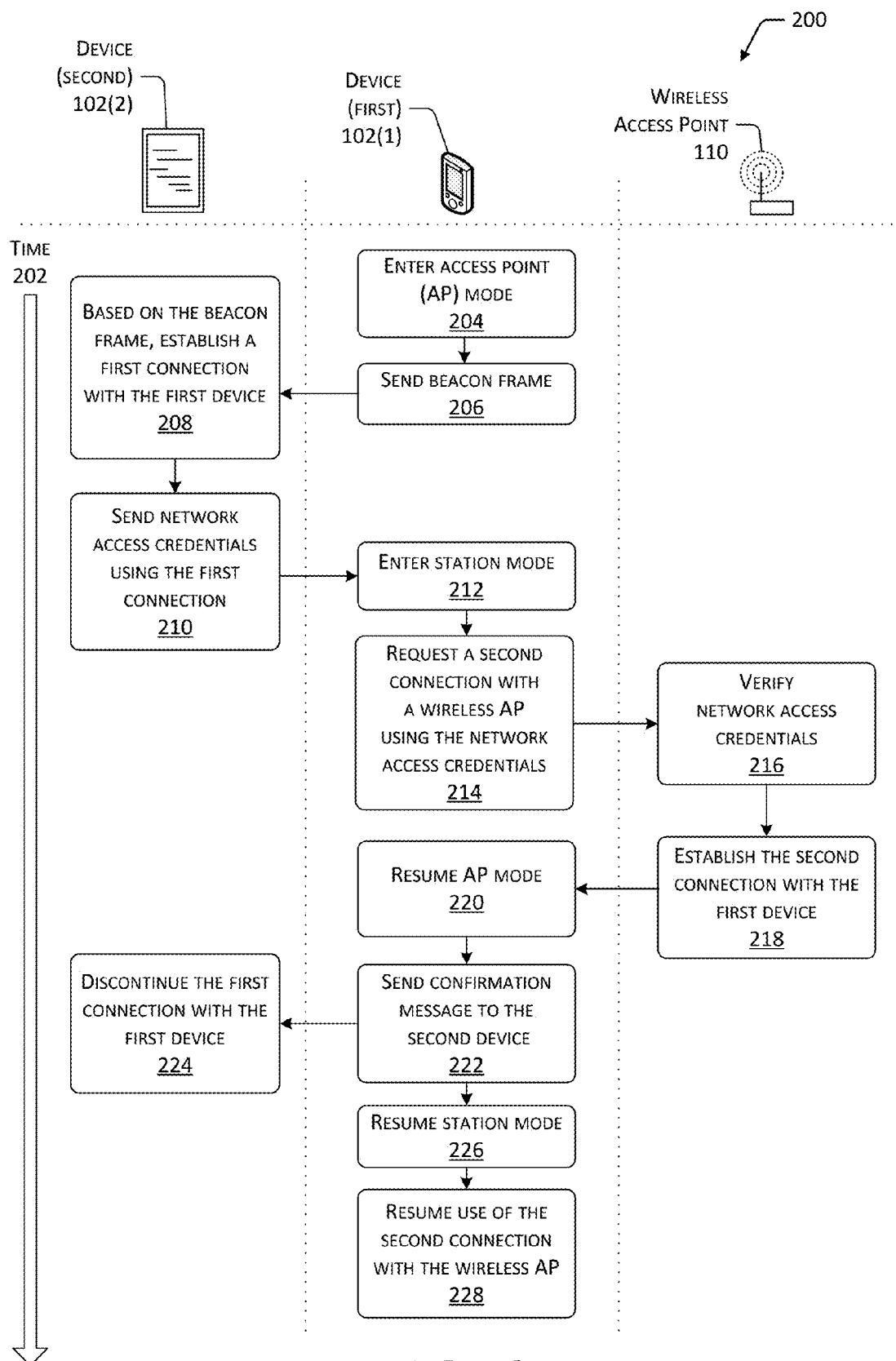
FIG. 2 illustrates respective devices and an access point, and a sequence of steps performed to connect one of the devices to the access point.

FIG. 2 depicts views 200 including a process for connecting a device 102(1) to a network by way of a wireless access point 110. As depicted, respective steps are performed over time 202. The views 200 are illustrative and non-limiting in nature. Other implementations, process steps, devices or elements, or variations may also be used.

At block 204, the first device 102(1) is activated and enters an access point (AP) mode. The communication module 104(1) of the first device 102(1) begins operations, activates various circuit portions, or performs other operations so as to function as an access point for a temporary wireless network 120.

At block 206, the first device 102(1) sends a beacon frame 118, including an identifier for the temporary wireless network 120. The beacon frame 118 may include other information as well, such as a name or identifier for the first device 102(1), a name or other identifying information for the user 116, or other data. The beacon frame 118 is repeatedly sent at intervals as a packet of data. Thus, the beacon frame 118 is broadcast at a rate that may be constant, or time-varying according to a predetermined pattern or function, in the interest of establishing contact with another device within RF signal range.

At block 208, the second device 102(2) receives the beacon frame 118 and responds to the first device 102(1). Specifically, the second device 102(2) uses the data or information included in the beacon frame 118 to connect with the first device 102(1), such that the temporary wireless network 120 is established. Thus, the first device 102(1) and the second device 102(2) are now in communication with each other, wherein the first device 102(1) functions as an access point to the temporary wireless network 120.

The first device 102(1) then interrogates the second device 102(2) to determine if an established wireless network exists that the first device 102(1) may connect to. Assuming that the second device 102(2) confirms that such a network is present, then the first device 102(1) issues a request for access to that established wireless network.

At block 210, the second device 102(2) sends network access credentials 122 to the first device 102(1). The network access credentials 122 may include an identifier for the established wireless network, a channel or channels used by the established wireless network, passwords or encryption keys required for communication over the established wireless network, or other data. At this time, the beacon frame 118 may also include information indicative of its present or near-future rate of broadcast so that the second device 102(2) is given notice to expect such a change. Other variations in the beacon frame 118 rate, data content, RF power level, or other characteristics may also be affected.

At block 212, the first device 102(1) enters a station mode. The communication module 104(1) activates circuitry, runs program code, or performs other functions so as to operate as a node or element within the established wireless network. The first device 102(1) may also reduce the rate at which the beacon frame 118 is sent, discontinue broadcast of the beacon frame 118, change the data content of the beacon frame 118, or perform other actions as a part of entering the station mode.

At block 214, the first device 102(1) issues a request to connect to a wireless access point 110 by way of wireless signals 106. The request may include the network access credentials 122, as well identifying information regarding the first device 102(1), an identity of the user 116, or other data. Thus, the first device 102(1) makes initial contact with the wireless access point 110.

At block 216, the wireless access point 110 verifies the network access credentials 122 as received from the first device 102(1). The communication module 104(4) of the wireless access point 110 may confirm that a network identifier is valid, check an identifier or serial number of the first device 102(1) against a known list of blocked or malicious devices, validate any encryption keys that may be sent, and so forth. The wireless access point 110 may perform other operations in the interest of maintaining security within the established wireless network, while determining if the first device 102(1) may be connected thereto.

At block 218, the wireless access point 110 establishes a connection with the first device 102(1). Thus, the first device 102(1) is now connected to the wireless access point 110 and may communicate with the second device 102(2) or the third device 102(3), access the Internet by way of the network(s) 112, and so on, as a member of the established wireless network. This connection may be referred to as a "second connection" for the first device 102(1), in view of the "first connection" with the second device 102(2) by way of the temporary wireless network 120.

At block 220, the first device 102(1) resumes the access point mode. The communication module 104(1) re-activates circuitry, returns to running program code, and so on, so as to operate as an access point for the temporary wireless network 120. The first device 102(1) may also perform other operations as part of returning to the access point mode.

At block 222, the first device 102(1) sends a confirmation message to the second device 102(2), indicative of the successful connection to the wireless access point 110. Thus, the first device 102(1) communicates that it has become a "member" of, or node within, the established wireless network by way of connection to the wireless access point 110. The first device 102(1) may also indicate to the second device 102(2) that operation of the temporary wireless network 120 is being terminated. The first device 102(1) may also indicate that the beacon frame 118 is being discontinued, or that future broadcasts will be sent at a lesser or different rate. Other data or information may also be communicated from the first device 102(1) to the second device 102(2), by way of the temporary wireless network 120.

At block 224, the second device 102(2) responds to the just-received information from the first device 102(1) by discontinuing operation by way of the temporary wireless network 120. The second device 102(2) may send an acknowledgement to the first device 102(1), or communicate other data, as a final usage of the temporary wireless network 120. Future communications between the second device 102(2) and the first device 102(1) may be performed by way of the wireless access point 110, as respective nodes of the established wireless network.

At block 226, the first device 102(1) resumes the station mode. The communication module 104(1) may re-activate certain circuits, resume the running of particular program code, and so on, so as to operate as a node within the established wireless network, through the wireless access point 110.

At block 228, the first device 102(1) resumes communication with the wireless access point 110. The first device 102(1) may perform various functions, access respective resources, or the server 114, and so on, by way of wireless signals 106 communicated to and from the wireless access point 110. Other operations may also be performed.

The process and respective operations described above outline one of several ways in which a newly acquired device, illustrated by a smartphone, may be readily connected to an established wireless network, or "network-of-things", while imposing little or no burden on the user. Generally, such a new device is activated or energized within RF operating range of the wireless network to be connected to. The new device then acts as a wireless access point, and sends a beacon frame conveying corresponding data. The beacon frame may be sent at varying intervals of time in accordance with respective methods in the interest of attracting the attention of a device already established within the sought-after established wireless network, while simultaneously conserving battery-based energy resources.

The new device then establishes a temporary wireless connection with a device that responds to the beacon frame, and requests network access credentials for the established wireless network. The new device then contacts a wireless access point and requests connection to the established wireless network, using the network access credentials provided by the device that responded over the temporary wireless network. Once the new device is connected as a member of the established wireless network, the new device may "sign off" with the responding device and terminate operation of the temporary wireless network. Termination or other changes in beacon frame broadcasting may also be performed. The foregoing or other analogous processes may be substantially automated, lending themselves to use by headless devices, conserving battery power within various portable apparatus, and so forth.

As illustrated above, the first device 102(1) switches, or transitions, between modes including an access point mode and a station mode, according to operations to be performed in those respective modes. In another instance, a device 102 may be configured to operate, or maintain, two or more such modes simultaneously. Thus, it is contemplated that different devices 102 may operate in accordance with suitable variations by virtue of varying resources or capabilities.

Figure 3:
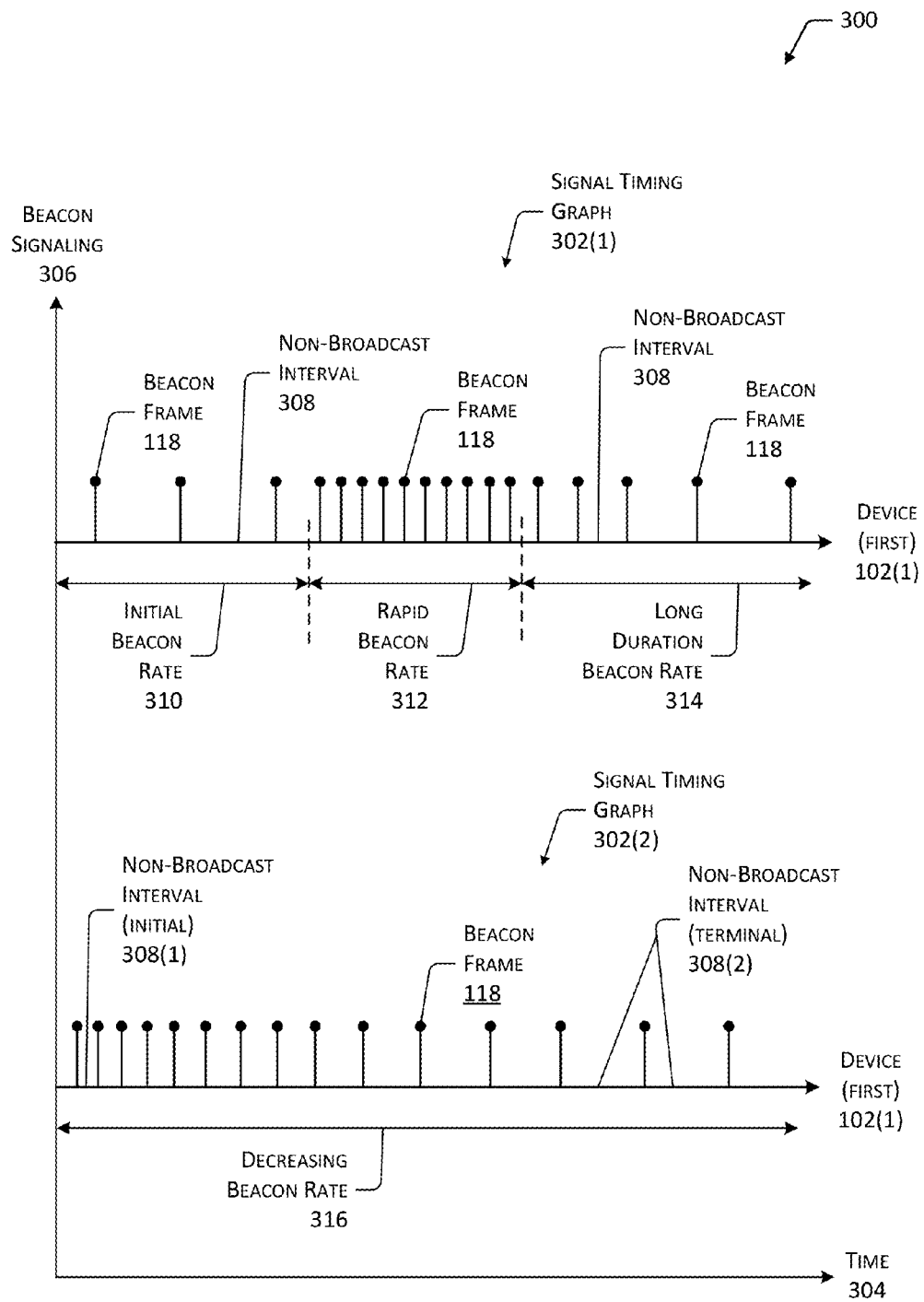
FIG. 3 illustrates two signal timing graphs, wherein beacon frames are sent at respectively different rates according to different rates.

FIG. 3 depicts views 300 including respective signal timing graphs 302(1) and 302(2). The signals, values, time-dependent elements, or other aspects of the views 300 are illustrative and non-limiting, and other elements, details, or operations corresponding to other signal timing schemes may also be used.

The signal timing graphs 302(1) and 302(2) are defined by a time axis 304 and a beacon signaling axis 306 that is orthogonal thereto. The signal timing graph 302(1) includes a sequence of discrete beacon frame 118 transmissions having respective non-broadcast intervals 308 there between. The beacon frame 118 broadcasts may be of equal lengths of time, or approximately so, or may vary in accordance with the respective data or information content of each. The beacon frame 118 transmissions or broadcasts originate from a device 102 that is seeking access to an established wireless network, such as the first device 102(1).

The beacon frame 118 transmissions may include various data or information, including an indication as to when the next beacon frame 118 transmission should occur. For instance, a particular beacon frame 118 transmission may indicate that the next beacon frame 118 will be sent in one-half second. That is, any particular beacon frame 118 transmission may specify the duration of the immediately following non-broadcast interval 308. Other data or notice-related indications may also be used.

In another instance, a device 102 may transmit a subsequent beacon frame 118 earlier than was indicated in the prior beacon frame 118. In still another instance, a device 102 may transmit a beacon frame 118 at an actual rate that is faster than an indicated rate. Other beacon frame 118 transmission rates or indication correspondences may also be used.

As depicted, the signaling timing graph 302(1) includes an initial beacon rate 310 characterized by beacon frame 118 transmissions separated by relatively lengthy non-broadcast intervals 308. For non-limiting example, each of the non-broadcast intervals 308 may be six seconds in length, during an initial beacon rate 310 period of thirty seconds total. Other suitable time spans may also be used.

In this way, the first device 102(1) may conserve energy drawn from the battery 108, while seeking to make contact with another device 102. Such a technique may be effective, for instance, if the user 116 activates the first device 102(1), and then turns their attention to another device 102 to make sure it is capable of responding, is presently "awake" or in an active state, and so forth. That is, the initial beacon rate 310 attempts to balance opposing goals: detection by another device 102 and conservation of limited stored power.

The signaling timing graph 302(1) also includes a rapid beacon rate 312 that follows the initial beacon rate 310 in time 304. The rapid beacon rate 312 is characterized by beacon frame 118 transmissions separated by relatively short non-broadcast intervals 308. For non-limiting example, each of the non-broadcast intervals 308 may be one second in length, over a rapid beacon rate 312 of one-hundred twenty seconds total duration. Other suitable time spans may also be used.

During the rapid beacon rate 312, the first device 102(1) is attempting to attract the attention of another device 102, such as the second device 102(2), so as to reduce discovery latency and establish contact by way of the temporary wireless network 120 as expeditiously as possible. The sooner the first device 102(1) is able to connect with the second device 102(2), or another responding device 102, the sooner the beacon frame 118 broadcasts may be terminated or substantially curtailed and battery 108 energy may be conserved.

The signaling timing graph 302(1) further includes a long duration beacon rate 314 that follows the rapid beacon rate 312. The long duration beacon rate 314 is characterized by beacon frame 118 transmissions separated by progressively longer non-broadcast intervals 308. For non-limiting example, the non-broadcast intervals 308 may increase over time in accordance with a linear or non-linear function. The non-broadcast intervals 308 of the long duration beacon rate 314 may also become fixed at some predetermined maximum length after a predetermined time span. Other suitable techniques or time spans may also be used.

During the long duration beacon rate 314, the first device 102(1) continues to try to make contact with another device 102, while also intensifying energy conservation efforts with respect to the battery 108. Such an operating strategy may assume that another device 102, being of suitable wireless resources and within RF signal range, will most likely respond to the beacon frame 118 transmissions during the rapid beacon rate 312. However, such another device 102 may still respond and contact may be established after the rapid beacon rate 312 has ended. For instance, the long duration beacon rate 314 may succeed in a situation where the second device 102(2) has taken considerable time to boot or "wake up", or wherein the user 116 has been briefly distracted by other tasks.

The signaling timing graph 302(1) illustrates various beacon frame 118 transmission rates or techniques that may be used alone, or in other respective combinations or sequences. For instance, a device 102 having substantial battery 108 energy reserves may employ the rapid beacon rate 312 exclusively, or for a protracted period of time, in the interest of reducing or minimizing time delay before discovery by another device 102. In another instance, a device 102 may use a rate analogous to the initial beacon rate 310 exclusively, in view of relatively lesser battery 108 energy reserves. Other operations or strategies may also be used.

The signaling timing graph 302(2) includes a decreasing beacon rate 316, characterized by beacon frame 118 transmissions separated by non-broadcast intervals 308 of progressively increasing length. Specifically, the non-broadcast intervals 308 may vary in length between an initial non-broadcast interval 308(1), and a terminal non-broadcast interval 308(2). Thus, the decreasing beacon rate 316 transitions between an initial rate (greater) and a terminal rate (lesser).

For non-limiting example, the initial non-broadcast interval 308(1) may be one-half second in length, and the terminal non-broadcast interval 308(2) may be three seconds in length. In turn, the intervening non-broadcast intervals 308 may be of successively increasing lengths in accordance with linear interpolation or another suitable function. Other functions or techniques, resulting in beacon frame 118 transmissions at respective time-varying rates, may also be used. For instance, logarithmic, sinusoidal, linear piecewise, linear or non-linear ramp or decay, or other time-dependent functions may be used to determine respective non-broadcast intervals 308.

Figure 4:
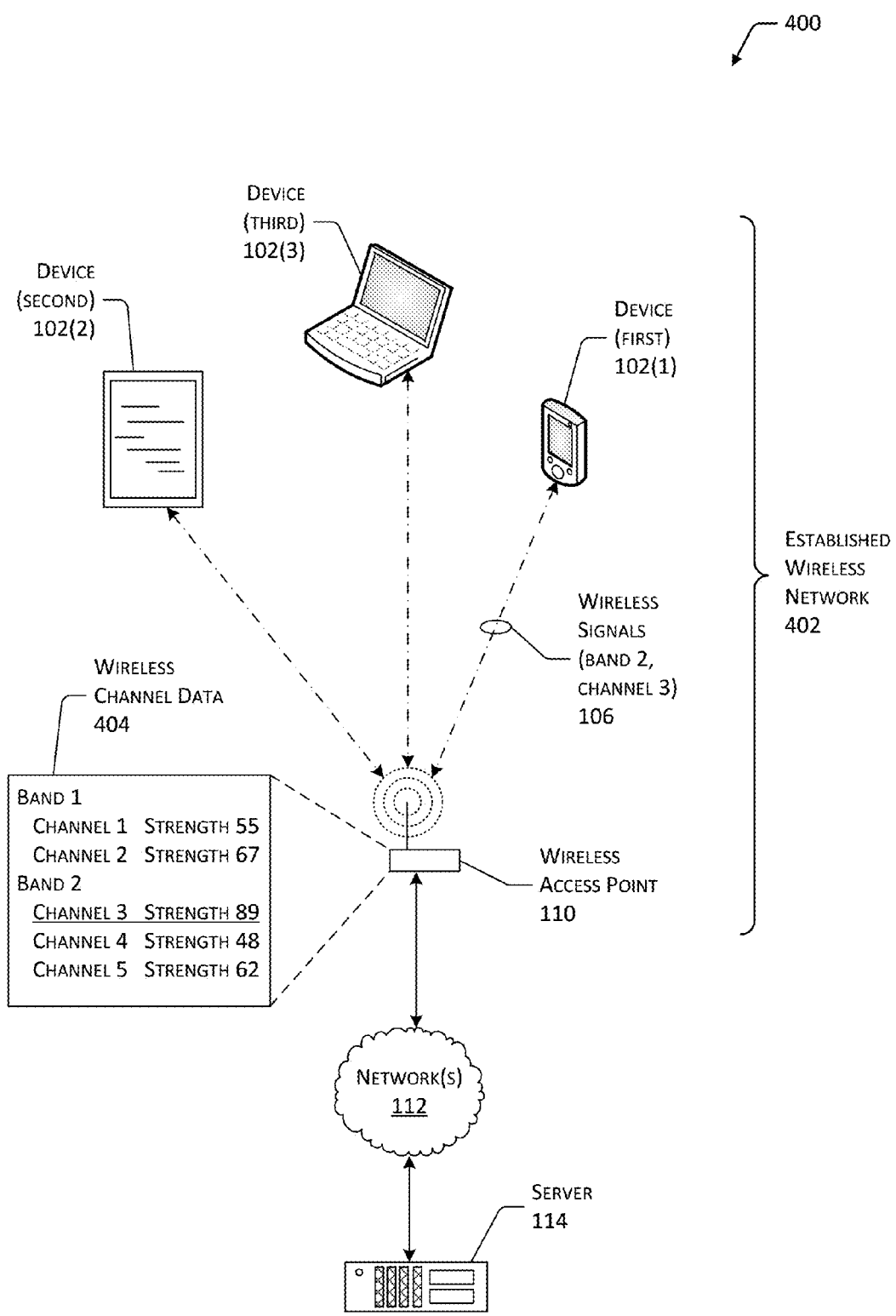
FIG. 4 depicts an established wireless network, wherein a device connects to the network by way of the wireless channel having the greatest signal strength.

FIG. 4 depicts views 400 of a system including devices 102 and other elements of a wireless network. The views 400 and respective aspects thereof are illustrative and non-limiting in nature, and other elements, devices, operations, or systems may also be used.

As depicted, the first device 102(1), the second device 102(2), and the third device 102(3) are connected to the wireless access point 110, so as to communicate by way of wireless signals 106. In one instance, the wireless signals 106 conform to a Wi-Fi protocol. As such, the respective devices 102(1)-102(3) and the wireless access point 110 define an established wireless network 402. The established wireless network 402 may also be referred to as a network-of-things, as well. The devices 102(1)-102(3) may communicate data, information, exchanges digital photographs or other files, access the server 114 or other resources of the network(s) 112, by way of the wireless access point 110. In turn, the wireless access point 110 may also serve to maintain security within the established wireless network 402 through the use of encrypted transmissions, password-based access, or other techniques.

As also depicted by wireless channel data 404, the wireless access point 110 is configured to operate on a plurality of different RF channels, organized as one or more bands. For instance, a "Band 1" includes a "Channel 1" and a "Channel 2", while a "Band 2" includes "Channel 3", "Channel 4", and "Channel 5", respectively. While a total of 2 bands and 5 channels are shown for clarity, other suitable band or channel counts, or channel number designations within respective bands, may also be considered.

Each of the five respective channels is characterized by a signal strength value. As depicted, the five corresponding signal strength values are "55", "67", "89", "48" and "62", respectively, wherein "Channel 3" corresponds to the strongest signal strength value "89". In one instance, these respective signal strengths may be measured by circuitry or other resources of the wireless access point 110, and then communicated as data to one or more of the devices 102 (1)-102(3) by way of wireless signals 106.

Another illustrative example is as follows: the user 116 brings the first device 102(1) into RF signal range with the other elements of the established wireless network 402. The first device 102(1) is then activated, at which time the user 116 presses a predetermined button, actuates a soft control, or manipulates some other user input device so as to initiate a "configuration" mode of the first device 102(1). The first device 102(1) then monitors or "listens to" the five respective wireless channels. Such monitoring may be performed one channel at a time, or on several channels or bands simultaneously, as resources or capabilities permit.

Eventually, the first device 102(1) has monitored various wireless signal communications on the five respective channels, measuring the corresponding signal strengths of each. The signal strength values may be averaged on a per-channel basis, or processed in other ways. The first device 102(1) then analyzes the various signal strength values, and selects "Channel 3" in accordance with the signal strength value of "89", which is the greatest of the five values measured or derived.

The first device 102(1) may then assumes an access point mode of operation, using the selected "Channel 3" for transmission of a beacon frame 118, in an attempt to establish contact with one of the devices 102(2) or 102(3). Other steps or operations may be performed as described elsewhere herein, such that the first device 102(1) acquires network access credentials 122, connects to the wireless access point 110, and joins the established wireless network 402. Such other operations or steps may be as described elsewhere herein, or may be suitable variations thereof.

Accordingly, a device 102 may be introduced into an area or zone where an established wireless network 402 is operating. The device 102 may then operate according to a configuration or other mode so as to monitor wireless signal 106 traffic and determine values for one or more selection criteria. The values of the selection criteria may be indicative of wireless activity and used to select a corresponding channel. For example, the selection criteria may include one or more of: signal strength of various wireless messages being transmitted over those channels, a count of the number of unique devices communicating, quantity of traffic exchanged, unique service set identification numbers (SSID) count, unique basic SSID (BSSID) count, and so forth. The device 102 may then assume an access point mode using the selected channel, and perform various progressive steps so as to connect to the established wireless network 402.

The channel having the greatest value of one or more selection criteria, such as exhibiting a greatest wireless signal strength, is likely to be the same channel as the wireless access point 110 or another primary data source for a particular wireless network. Changing the wireless channel or band in use by a radio of the device 102 involves a delay during which that radio is unavailable. For example, a radio frequency circuit of a wireless communication interface may require several seconds to change from channel 1 to channel 6 and settle into operation on channel 6. These delays may impact data transfer, introduce delays, and so forth. When using the same wireless channel or band, rather than modifying operation of the radio frequency circuit, the device 102 may change data associated with use in that channel or band, operating characteristics such as access point mode or station mode, and so forth very quickly. By selecting the wireless channel or band for use which is determined to have the greatest wireless signal strength, the device 102 is able to more quickly transfer between connections on two different wireless networks because, being within the same channel or band, no time is necessary for the radio frequency circuit to settle or readjust. The ability to quickly transfer between wireless networks which coexist in the same band or channel facilitates acquisition and testing of the network access credentials 122, beacon frame transmission, improve data throughput, and so forth.

Selecting a particular wireless channel which is in use by a greatest detected number of different devices 102 may also increase the likelihood of being discovered by at least one of those devices 102 and receiving a corresponding response. Furthermore, selecting a busy channel may provide opportunity to make contact with plural other devices 102, such that network access credentials 122 are eventually acquired from one of them. Thus, various strategies may be used to select a wireless channel, sending the beacon frame 118 at various rates 310-316 in the interest of prompt discovery, selecting a busy channel in the interest of having greater contact opportunities, or other goals.

Figure 5:
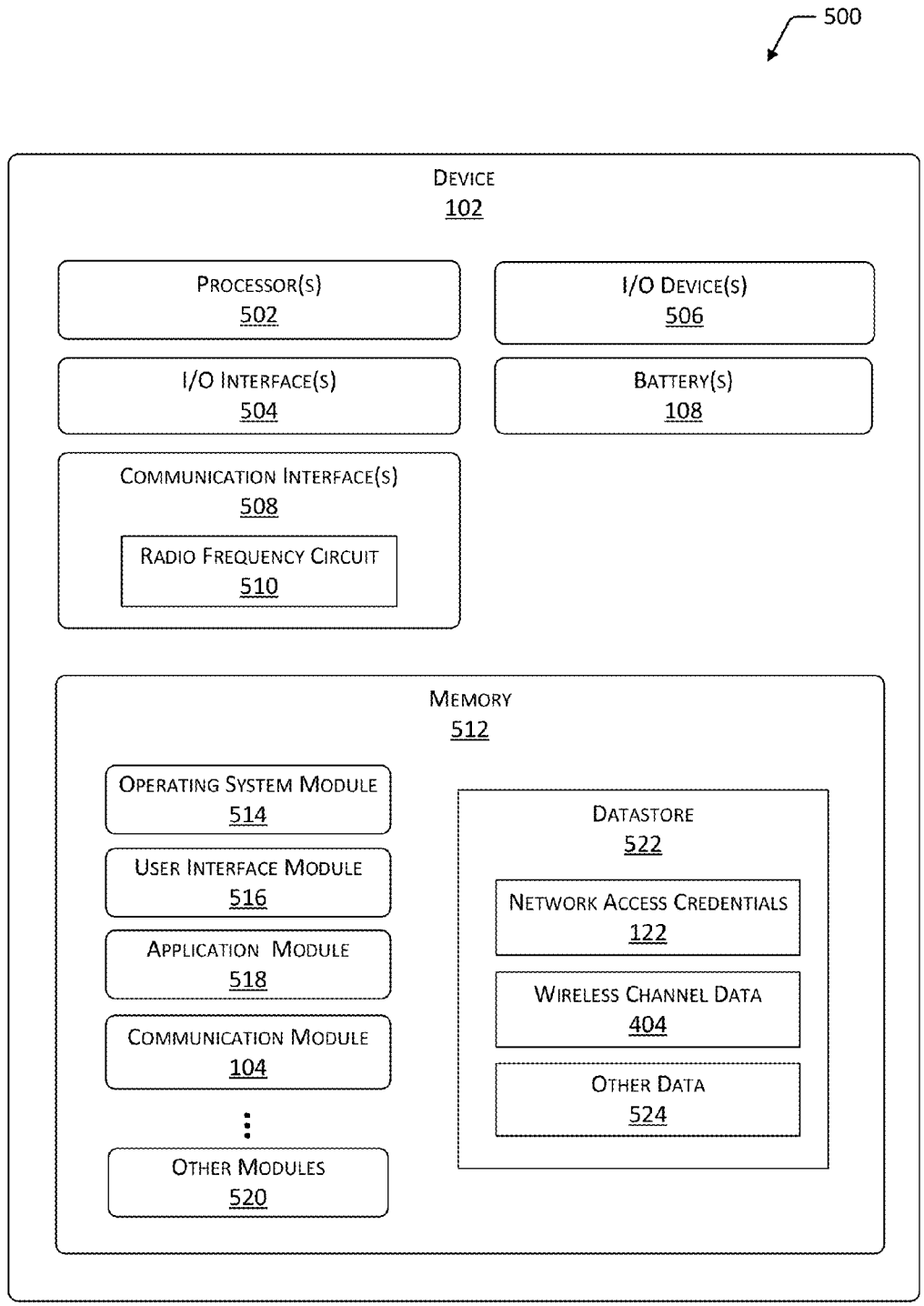
FIG. 5 is a block diagram depicting a device.

FIG. 5 illustrates a block diagram 500 of a device 102. The device 102 is illustrative and non-limiting, and may be defined by a tablet computer, a wearable computer, an e-book reader, a media device, a smartphone, a laptop computer, or another suitable apparatus. The device 102 may include one or more processors 502 configured to execute one or more stored instructions. The processor(s) 502 may comprise one or more cores.

The device 102 may include one or more I/O interface(s) 504 to allow the processor(s) 502 or other portions of the device 102 to communicate with various other devices 102, the wireless access point 110, the server 114, web-based resources, and so on. The I/O interfaces 504 may comprise I2C, SPI, USB, RS-232, and so forth.

The I/O interface(s) 504 may couple to one or more I/O devices 506. The I/O devices 506 may include one or more input devices such as a keyboard, a mouse, a microphone, a camera, user input buttons, and so forth. The I/O devices 506 may also include output devices such as one or more of a display, audio speakers, haptic output devices, and so on. In some embodiments, the I/O devices 506 may be physically incorporated within the device 102, or they may be externally placed.

The device 102 may also include one or more communication interfaces 508. The communication interfaces 508 are configured to provide communications with other devices 102, web-based resources, servers 114, routers, wireless access points 110, and so forth. The communication interfaces 508 may include wireless functions, devices configured to couple to one or more networks 112 including personal area networks (PANs), local area networks (LANs), wireless local area networks (WLANs), wide area networks (WANs), and so forth. The communication interfaces 508 may also include a radio frequency (RF) circuit 510 configured to communicate wireless signals 106 in accordance with Wi-Fi, Bluetooth, a proprietary or military "battlefield" protocol, or in accordance with other protocols. The RF circuit 510 may also be configured or resourced to sense or "listen" for wireless signal traffic on various bands or channels, measure sensed wireless signal strength values, or perform other functions. The techniques in this disclosure are generally described with regard to the Wi-Fi protocol, however they are applicable to other protocols. For example, a Bluetooth hub may act in a fashion similar to the AP mode described herein, while a Bluetooth accessory may act in a fashion similar to the station mode.

The device 102 may also include one or more batteries 108 for providing electrical power during normal operations. The battery or batteries 108 may be rechargeable or disposable in nature. The device 102 may also include one or more busses or other internal communications hardware or software that allow for the transfer of data between the various modules and components of the device 102.

The device 102 includes one or more memories 512. The memory 512 comprises one or more computer-readable storage media (CRSM). The memory 512 provides storage of computer readable instructions, data structures, program modules, and other data for the operation of the device 102. The memory 512 may include at least one operating system (OS) module 514. Respective OS modules 514 are configured to manage hardware devices such as the I/O interfaces 504, the I/O devices 506, the communication interfaces 508, and provide various services to applications or modules executing on the processor(s) 502.

Also stored in the memory 512 may be one or more of the following modules. These modules may be executed as foreground applications, background tasks, and so forth. A user interface module 516 may be configured to provide one or more user interfaces, application programming interfaces, textual, graphic or audible instructions or assistance to the user 116, and so forth. The user interface module 516 may be configured to operate with information encoded as hypertext markup language ("HTML") files, extensible markup language ("XML") files, or in another suitable format or language. The user interface module 516 is configured to accept inputs and send outputs using the I/O interfaces 504, the communication interfaces 508, or both.

The memory 512 may also store one or more application modules 518. Non-limiting examples of the application modules 518 include a word processing application, a spreadsheet application, a technical drawing or illustrating application, a web browsing application, a portable document viewing application, and so on. The memory 512 may also include the communication module 104 as described elsewhere herein. The memory 512 may further store one or more other modules 520. Non-limiting examples of the other modules 520 may include cellular or satellite communications circuitry, a watchdog or other timer, a wireless internet receiver, ports or resources for wired communications, and so forth.

The memory 512 may also include a datastore 522 to store information. The datastore 522 may use a flat file, database, linked list, tree, executable code, or other data structure to store the information. In some implementations, the datastore 522 or a portion of the datastore 522 may be distributed across one or more other devices 102 or computing devices including servers 114, network attached storage apparatus, and so forth.

The datastore 522 may store the network access credentials 122, the wireless channel data 404, or both, as respectively described elsewhere herein. The datastore 522 may also store other data 524. For example, the other data 524 may include device identification data such as a serial number or manufacturer, a user 116 name or identity, identifiers for use with one or more temporary wireless networks 120, or other data or encoded values. The other data 524 may further include one or more data structures that may be queried, modified, amended, and so forth.

Accordingly, any particular device 102 may be resourced and configured to act in accordance with a "configuration" mode, an access point mode, a station mode, or any combination of these or other modes toward the expeditious discovery or connection to respective established wireless networks 402. The device 102 may also send beacon frames 118 in accordance with various intervals or rates in the interest of rapid discovery by another device 102, so as to conserve battery 108 energy reserves, or in accordance with other goals or objectives.

Figure 6:
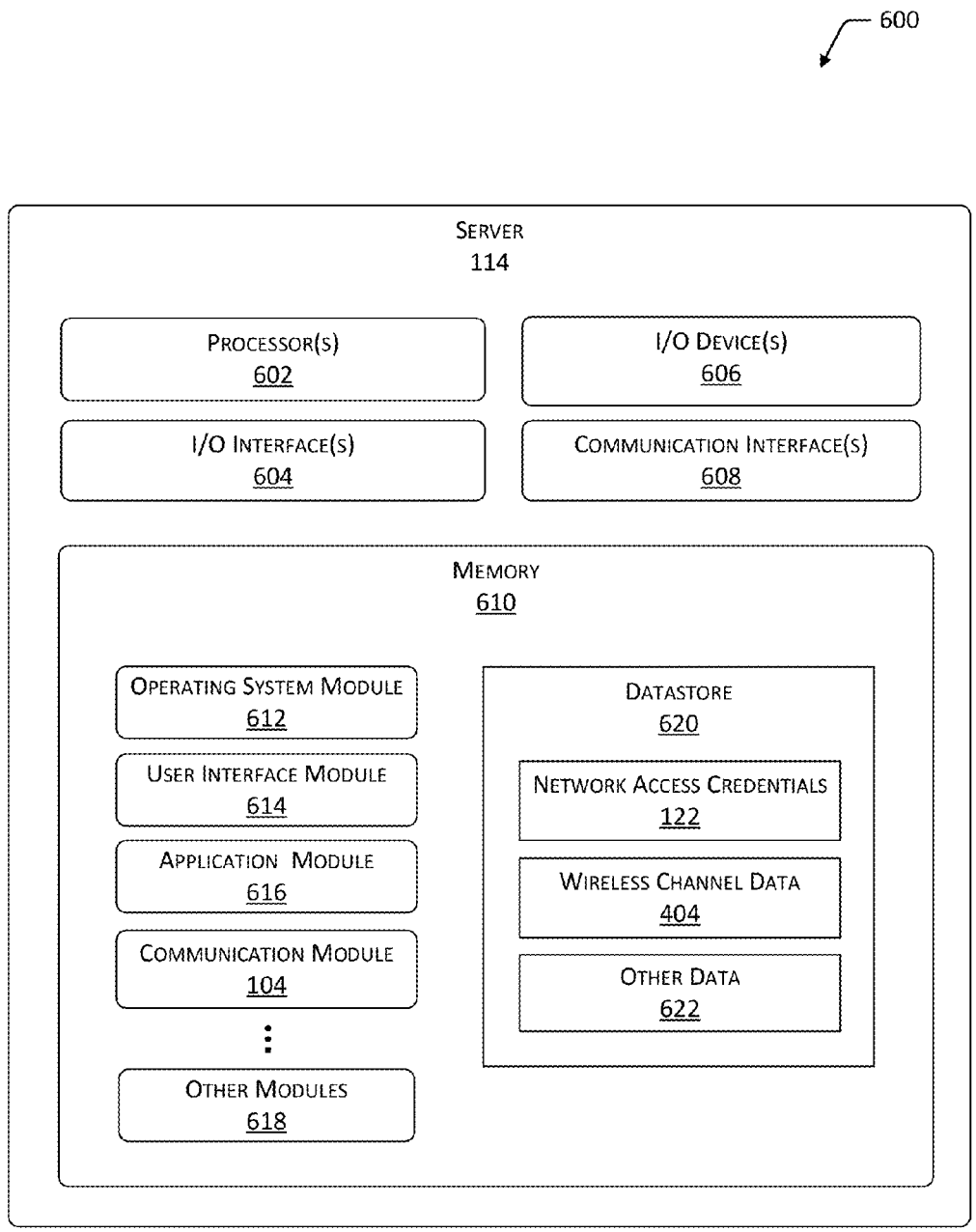
FIG. 6 is a block diagram depicting a server.

FIG. 6 illustrates a block diagram 600 of a server 114. The server 114 is illustrative and non-limiting, and may be defined by a rack-mounted server or another suitable apparatus. The server 114 may include one or more processors 602 configured to execute one or more stored instructions. The processor(s) 602 may comprise one or more cores, and may also be referred to as hardware processors.

The server 114 may include one or more I/O interface(s) 604 to allow the processor(s) 602 or other portions of the server 114 to communicate with various devices 102, other servers 114, computing apparatus or systems, web-based resources, and so on. The I/O interfaces 604 may comprise I2C, SPI, USB, RS 232, and so forth.

The I/O interface(s) 604 may couple to one or more I/O devices 606. The I/O devices 606 may include one or more input devices such as a keyboard, a mouse, a microphone, a camera, user input buttons, and so forth. The I/O devices 606 may also include output devices such as one or more displays, audio speakers, haptic output devices, and so forth. In some embodiments, the I/O devices 606 may be physically incorporated within the server 114, or they may be externally placed.

The server 114 may also include one or more communication interfaces 608. The communication interfaces 608 are configured to provide communications with other servers 114, various devices 102, web-based resources, routers, wireless access points 110, and so forth. The communication interfaces 608 may include wireless functions, devices configured to couple to one or more networks 112 including LANs, Wireless-LANs, WANs, and so forth. The server 114 may also include one or more busses or other internal communications hardware or software that allow for the transfer of data between the various modules and components of the server 114.

The server 114 includes one or more memories 610. The memory 610 comprises one or more non-transitory CRSM. The memory 610 provides storage of computer readable instructions, data structures, program modules, and other data for the operation of the server 114. The memory 610 may include at least one operating system (OS) module 612. Respective OS modules 612 are configured to manage hardware devices such as the I/O interfaces 604, the I/O devices 606, the communication interfaces 608, and provide various services to applications or modules executing on the processors 602.

Also stored in the memory 610 may be one or more of the following modules. These modules may be executed as foreground applications, background tasks, and so forth. A user interface module 614 may be configured to provide one or more user interfaces. The user interface module 614 may also provide one or more application programming interfaces. The user interface module 614 may be configured to operate with information encoded as hypertext markup language ("HTML") files, extensible markup language ("XML") files, or in another suitable format or language. The user interface module 614 is configured to accept inputs and send outputs using the I/O interfaces 604, the communication interfaces 608, or both.

The memory 610 may also store one or more application modules 616. Non-limiting examples of the application modules 616 include a word processing application, a data encrypting or decrypting application, a data structure generation or management application, a web browsing application, a portable document generating or viewing application, an application for generating one or more web pages, and so on.

The memory 610 may further store a communication module 104 as described elsewhere herein. The memory 610 may also include one or more other modules 618. Non-limiting examples of the other modules 618 may include, a watchdog or other timer, a wireless internet receiver, secured data handling or encryption/decryption resources, resources supporting Bluetooth or Wi-Fi wireless signaling protocols, and so forth.

The memory 610 may also include a datastore 620 to store information. The datastore 620 may use a flat file, database, linked list, tree, executable code, one or more data tables, or another data structure or structures to store the information. In some implementations, the datastore 620 or a portion of the datastore 620 may be distributed across one or more other servers 114 or computing devices 102, network attached storage apparatus, and so forth.

The datastore 620 may store the network access credentials 122, the wireless channel data 404, or both, as respectively described elsewhere herein. The datastore 620 may also store other data 622. For example, the other data 622 may include identification data such as a serial number or manufacturers for various different devices 102, a user 116 name or identity, identifiers corresponding to one or more established wireless networks 402, or other data or encoded values. The other data 622 may further include one or more data structures that may be queried, modified, amended, and so forth.

Figure 7:
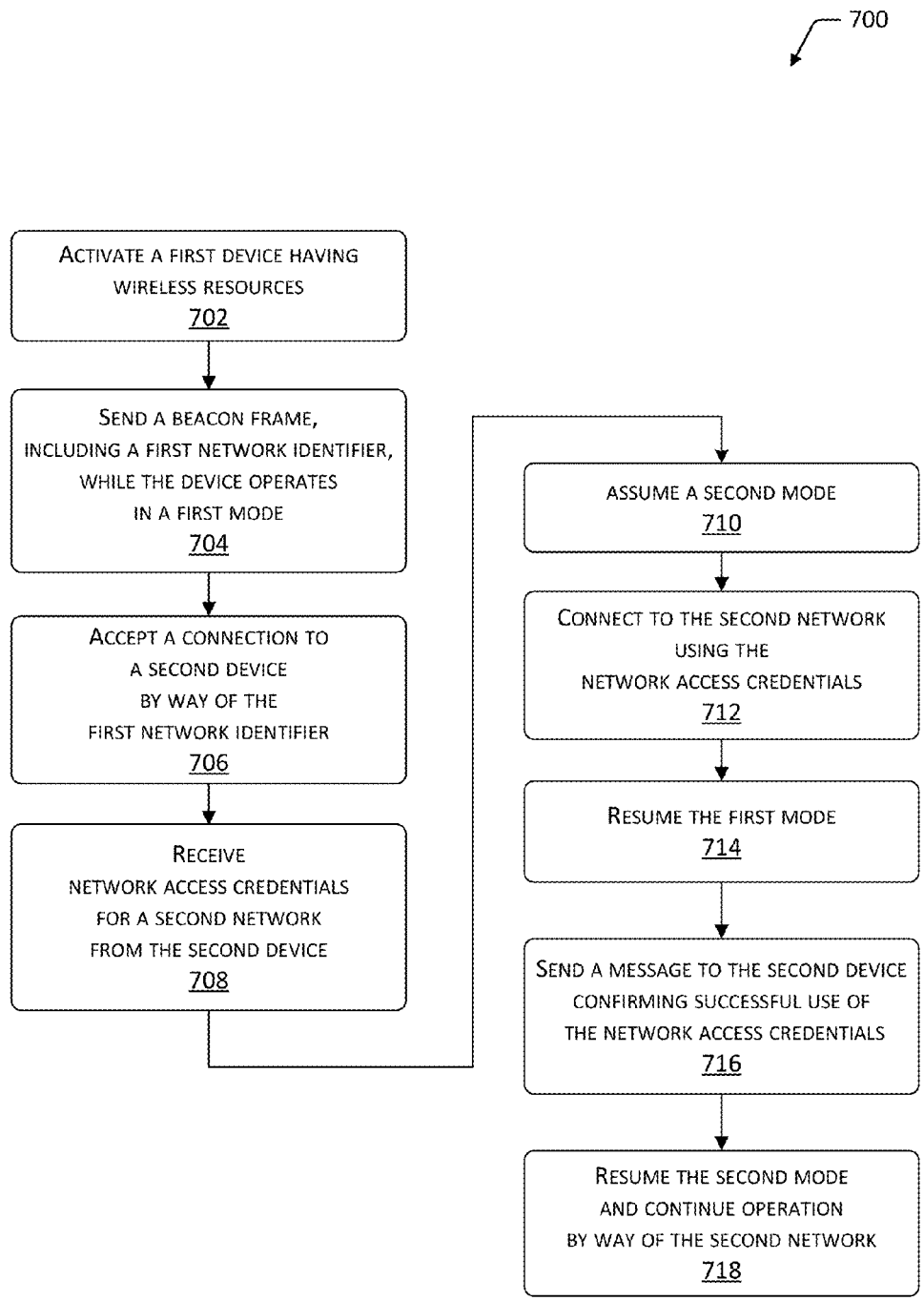
FIG. 7 is a flow diagram of an illustrative process including the connecting of a new device to an established wireless network.

FIG. 7 is a flow diagram 700 illustrating a process including sending a beacon frame 118 and connecting a device 102 to an established wireless network 402. The process of the flow diagram 700 is illustrative and non-limiting, and other processes including one or more other steps, omitting one or more of the depicted steps, or proceeding in other orders of execution, may also be used.

Block 702 activates a first device 102 having wireless resources. For purposes of a present example, the user 116 introduces a first device 102(1) into a zone or area having an established wireless network 402. The first device 102(1) may include an RF circuit 510 or other resources configured to communicate using wireless signals 106 in accordance with Wi-Fi protocol. The user 116 then activates or energizes the first device 102(1), which performs a start-up procedure. Thereafter, the communication module 104(1) assumes an access point mode directed to establishing a temporary wireless network 120 with another device 102.

Block 704 sends a beacon frame 118, including a first network identifier, while the device 102 operates in a first mode. In the present example, the first device 102(1), while operating in the access point mode, begins broadcasting a beacon frame 118 by way of wireless signals 106, wherein the beacon frame 118 includes an identifier for the temporary wireless network 120. The beacon frame 118 may also include other data or information, such as identifiers corresponding to the first device 102(1) or the user 116, or both, information regarding wireless signal 106 channel or band capabilities of the first device 102(1), or other data.

The beacon frame 118 may be sent repeatedly at a particular rate, having respective non-broadcast intervals 308 between each transmission. For instance, the beacon frame 118 may be broadcast in accordance with the decreasing beacon rate 316. Other suitable beaconing rate strategies may also be used.

Block 706 accepts a connection to a second device 102(2) by way of the first network identifier. In the present example, the second device 102(2) receives the beacon frame 118 transmissions and sends a response to the first device 102(1). The first device 102(1) then accepts a wireless connection with the second device 102(2) such that the temporary wireless network 120 is defined, wherein the first device 102(1) operates as an access point.

Block 708 receives network access credentials 122 for a second network from the second device 102(2). In the present example, the first device 102(1) may send a request to the second device 102(2) seeking to join an established wireless network 402. Such a request is sent by way of the temporary wireless network 120. The second device 102(2) sends network access credentials 122 to the first device 102(1) in response to the request. The network access credentials 122 may include an identifier for the established wireless network 402, one or more channels or bands used thereby, one or more encryption keys or passwords, or other information as required to make contact with the wireless access point 110. The first device 102(1) receives the network access credentials 122, and may send an acknowledgement back to the second device 102(2).

Block 710 assumes a second mode. In the present example, the communication module 104(1) assumes a station mode of operation. The communication module 104(1) may thus activate circuitry, run program code, or performs other actions in preparation for functioning as a node or element within the established wireless network 402.

Block 712 connects to the second network using the network access credentials 122. In the present example, the first device 102(1) sends the network access credentials 122, in whole or in part, to the wireless access point 110, which validates the network access credentials 122 as received from the first device 102(1). The wireless access point 110 may communicate with the server 114 or other resources of the network(s) 112 seeking information regarding the particular first device 102(1), verifying that the user 116 is permitted access to the established wireless network 402, and so on. Other security-related operations or steps may also be performed.

Once the network access credentials 122 or other pertinent data have been verified, the wireless access point 110 may accept a connection to the first device 102(1). The first device 102(1) has now been added to, and is a member or node of, the established wireless network 402. The communication module 104(1) of the first device 102(1), while operating in the station mode, may access the Internet, the server 114, or other resources coupled to the network(s) 112, or may communicate with the second device 102(2) or the third device 102(3), or perform other communications by way of the wireless access point 110.

Block 714 resumes the first mode. In the present example, the communication module 104(1) may reactivate particular circuitry, run specific program code, and so on, so as to return to the access point mode. The communication module 104(1) may also resume sending the beacon frame 118 in accordance with a different rate or interval pattern. For instance, the beacon frame 118 may be sent in accordance with relatively longer non-broadcast intervals 308 so as to conserve battery 108 energy reserves, or in accordance with other reasons or goals. In another instance, the communication module 104(1) may discontinue sending the beacon frame 118 altogether. Other beacon framing rates may also be used.

Block 716 sends a message to the second device 102(2) confirming successful use of the network access credentials 122. In the present example, the first device 102(1) sends a message by way of the temporary wireless network 120 to the second device 102(2), indicative of successful connection to the established wireless network 402. The message may also indicate intent to discontinue operation of the temporary wireless network 120 immediately or after a particular period of time, indicate future changes in sending the beacon frame 118 or the transmission rate, and so on. Future wireless signal 106 communication between the first device 102(1) and the second device 102(2) may be performed by way of the established wireless network 402.

Block 718 resumes the second mode and continues operation by way of the second network. In the present example, the communication module 104(1) transitions, or switches from, the access point mode back to the station mode. As such, the first device 102(1) may access various resources or the Internet by way of the network(s) 112, communicate with the devices 102(2) and 102(3), and so forth, as a member of the established wireless network 402 and while operating in the station mode. Other operations may also be performed.

Figure 8:
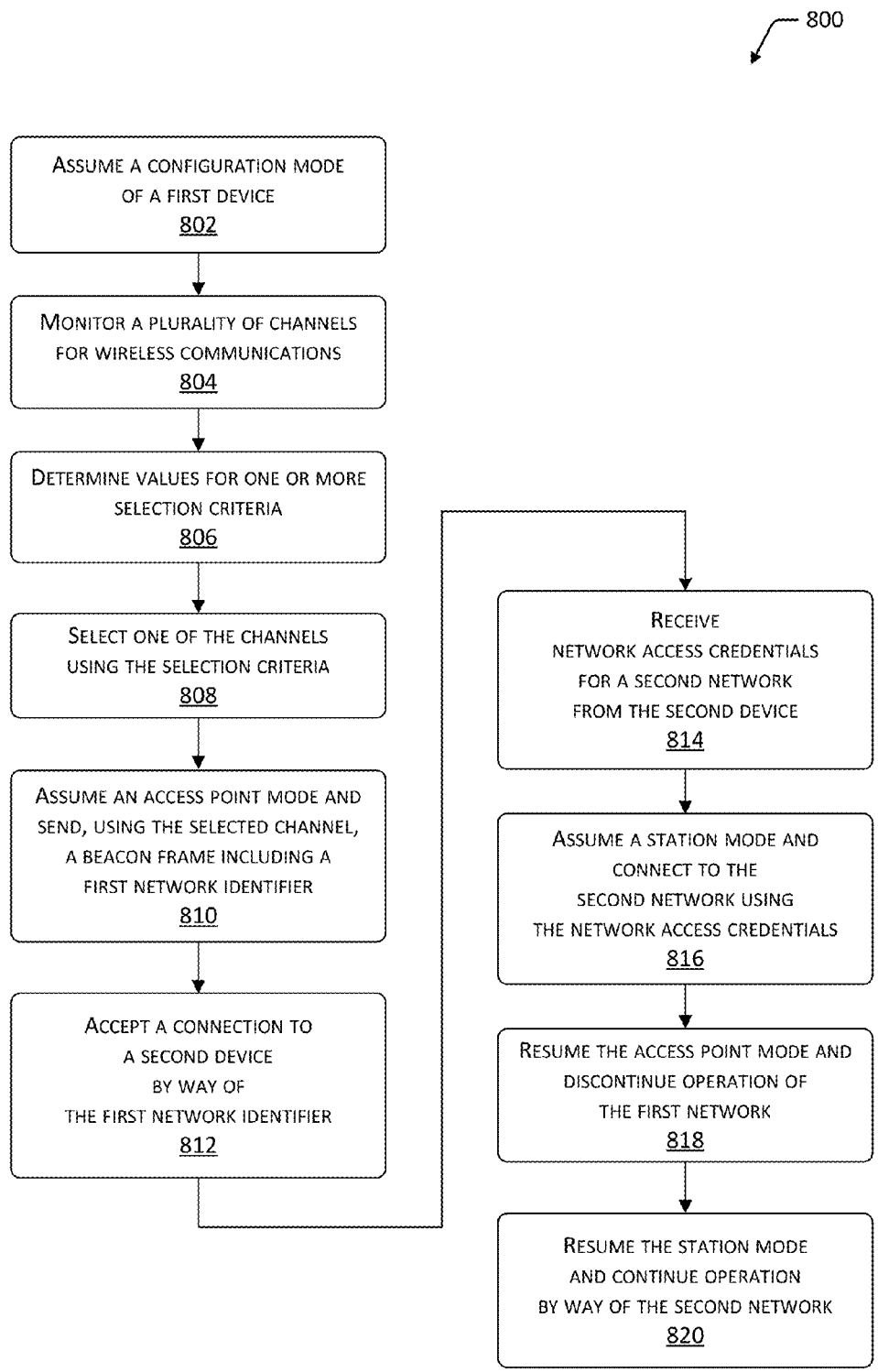
FIG. 8 is a flow diagram of an illustrative process including connecting of a new device to an established wireless network in accordance with a wireless channel having an access point with the greatest measured signal strength.

FIG. 8 is a flow diagram 800 illustrating a process including monitoring respective wireless channels, and using a selected one of the channels to connect a device 102 to an established wireless network 402. The process of the flow diagram 800 is illustrative and non-limiting, and other processes including one or more other steps, omitting one or more of the depicted steps, or proceeding in other orders of execution, may also be used.

Block 802 assumes a configuration mode of a first device 102(1). For purposes of a present example, the user 116 activates the first device 102(1) within RF signal range of an established wireless network 402. The communication module 104(1) assumes a "configuration" mode, in preparation for detecting and connecting to the established wireless network 402.

Block 804 monitors a plurality of channels for wireless communications. In the present example, the communication module 104(1) uses the RF circuit 510 or other suitable resources to monitor for wireless signal 106 messages or traffic on a plurality of different channels. The respective channels may correspond to communications in accordance with the Wi-Fi protocol. Other wireless signaling protocols may also be considered.

For purposes of non-limiting example, the communication module 104(1) spends respective periods of time monitoring wireless signals 106 communicated over a total of five respective channels, designated within two RF bands. The communication module 104(1) also uses the RF circuit 510 or other resources to measure respective signal strength values of the wireless signals 106 detected during the monitoring process.

Block 806 determines values for one or more selection criteria. For instance, the communication module 104(1) may measure signal strengths for respective wireless signals 106 monitored on one or more channels, count the number of unique devices that are sending wireless signals 106 on the monitored channels, determine the quantity of wireless signal 106 traffic sent on the monitored channels, or a combination thereof. Block 808 selects one of the channels using the selection criteria. In the present example, the communication module 104(1) measures or derives respective wireless signal strength values for each of the five monitored RF channels. In particular, "Channel 3" exhibits the maximum measured signal strength, relative to the others, with a value of "89". The communication module 104(1) thus selects "Channel 3" for operations in the next step. In a different example, the communication module 104(1) may select the busiest channel in accordance with a number of different SSIDs detected, or in accordance with other selection criteria described above.

The communication module 104(1) may apply two or more techniques to the monitored channels, and then select a channel in accordance with a predetermined selection hierarchy, heuristics, or other scheme. For instance, the communication module 104(1) may determine that a "Channel 3" has a greatest wireless signal strength of "89", and that a "Channel 5" has three different devices thereon, which is the greatest count on any of the monitored channels. The communication module 104(1) may be further configured to compare these respective values to predetermined threshold values, and select the "Channel 3" corresponding to the greatest wireless signal strength, in accordance with a selection hierarchy.

In the present illustration, the communication module 104(1) gives priority to the strength-of-signal technique over the device-count technique, if the greatest measured wireless signal 106 strength exceeds "85", or if the greatest number of different devices on any monitored channel is less than five. Other values, parameters, thresholds, hierarchies, or selection strategies may also be used.

In other implementations, other channel selection strategies may also be used, such as assigning different selection criteria different weights and determining an aggregate score for the channel, using different selection strategies based on time of day, day of week, and so forth.

Block 810 assumes an access point mode and sends, using the selected channel, a beacon frame 118 including a first network identifier. In the present example, the communication module 104(1) assumes or operates in an access point mode of operation, and sends a beacon frame 118 on the selected "Channel 3" at intervals in accordance with one or more rates. For instance, the beacon frame 118 may be sent in accordance with, or analogous to, the rapid beacon rate 312, wherein non-broadcast intervals 308 of one-half second separate the respective beacon frame 118 transmissions. Other suitable rates may also be used.

The beacon frame 118 includes an identifier corresponding to a temporary wireless network 120 to be established, and may also include an identifier or serial number of the first device 102(1), a name or identity of the user 116, and so on. Other data may also be included with each beacon frame 118 broadcast or packet. The beacon frame 118 is formatted to invite a receiving device 102 to join the temporary wireless network 120, wherein the first device 102(1) operates as the access point.

Block 812 accepts a connection to a second device 102(2) by way of the first network identifier. In the present example, the second device 102(2) responds to the beacon frame 118 and sends a wireless signal 106 response back to the first device 102(1) using the "Channel 3". The response from the second device 102(2) may also include the identifier for the temporary wireless network 120, as well as other data or information. The first device 102(1) then accepts a connection to the second device 102(2) such that the temporary wireless network 120 is defined, wherein the first device 102(1) functions as an access point.

Block 814 receives network access credentials 122 for a second network from the second device 102(2). In the present example, the first device 102(1) may use the temporary wireless network 120 to send a request to the second device 102(2), seeking to join the established wireless network 402. The second device 102(2) may then send the requested network access credentials 122 to the first device 102(1). The network access credentials 122 may include an identifier for the established wireless network 402, one or more encryption keys or passwords, or other information so as to make contact with the wireless access point 110. The first device 102(1) receives the network access credentials 122, and may send an acknowledgement back to the second device 102(2).

Block 816 assumes a station mode and connects to the second network using the network access credentials 122. In the present example, the communication module 104(1) assumes, or operates in, a station mode and sends a request to connect 124 to the wireless access point 110, by wireless signal 106 over the "Channel 3". The request to connect 124 may include some or all of the network access credentials 122, may identify the first device 102(1) or the user 116, and so forth. The request to connect 124 further indicates that the first device 102(1) seeks to be added to the established wireless network 402. The first device 102(1) discontinues sending the beacon frame 118 while operating in the station mode.

The wireless access point 110 may then validate the network access credentials 122 received from the first device 102(1), performing one or more security-related verification steps accordingly. Once the network access credentials 122 have been verified, the wireless access point 110 may accept a connection to the first device 102(1). The first device 102(1) has now been added to the established wireless network 402. The first device 102(1), while operating in station mode, may access the Internet, communicate with the second device 102(2) or the third device 102(3), and so on, by way of the established wireless network 402.

Block 818 discontinues operation of the first network. In the present example, the communication module 104(1) may resume the access point mode and send a message to the second device 102(2) indicating imminent termination of the temporary wireless network 120. The message may also indicate that the first device 102(1) has been added to the established wireless network 402. Other information or data may also be included. The communication module 104(1) then discontinues operation of the temporary wireless network 120, ceasing operation as an access point thereto.

Block 820 resumes the station mode and continues operation by way of the second network. In the present example, the communication module 104(1) resumes operating in the station mode, communicating with other devices 102 or entities by way of the wireless access point 110.

Figure 9:
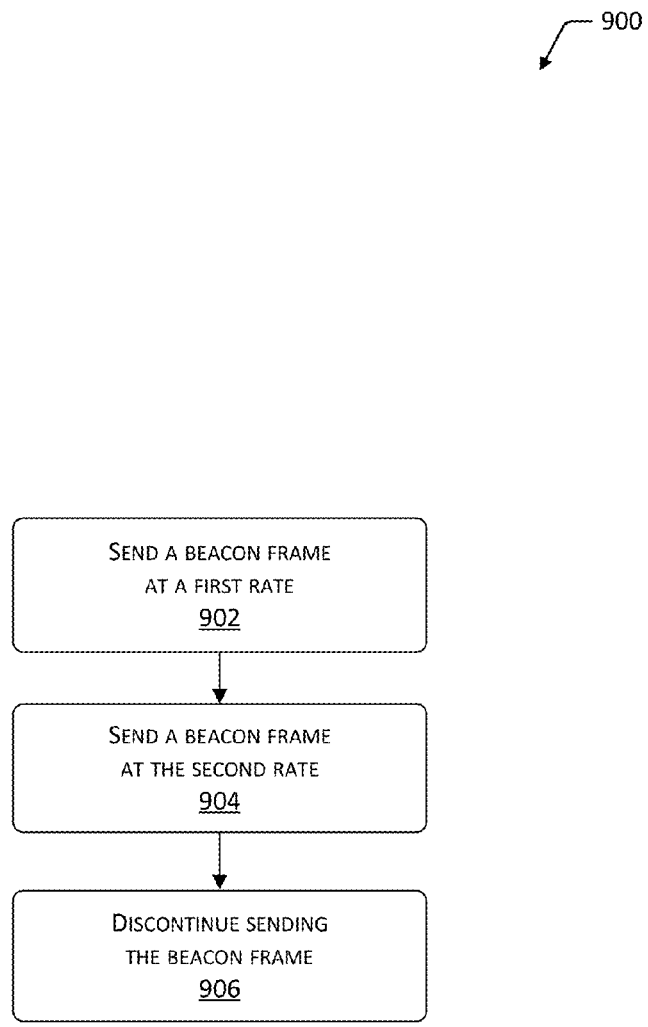
FIG. 9 is a flow diagram of an illustrative process including the sending of a beacon frame at different rates.

FIG. 9 is a flow diagram 900 illustrating a process including sending a beacon frame 118 at various rates while attempting to connect to another device 102. The process of the flow diagram 900 is illustrative and non-limiting, and other processes including one or more other steps, omitting one or more of the depicted steps, or proceeding in other orders of execution, may also be used.

Block 902 sends a beacon frame 118 at a first rate. For purposes of a present example, the first device 102(1) is activated and the communication module 104(1) assumes an access point mode. The communication module 104(1) causes the RF circuit 510 to transmit a beacon frame 118 in accordance with the rapid beacon rate 312. Thus, respective beacon frame 118 transmissions are separated by relatively brief non-broadcast intervals 308, for instance one-half second each.

Each beacon frame 118 may also include an indication of the present beacon frame 118 transmission rate, or the duration of the non-broadcast interval 308 immediately following the present beacon frame 118 event. The first device 102(1) is actively seeking to connect to another device 102, while conserving battery 108 energy reserves is a secondary consideration at this time. The rapid beacon rate 312 may be used, for instance, for a period of one minute. Other operating time periods may also be used.

Block 904 sends a beacon frame 118 at the second rate. In the present example, the communication module 104(1) now sends the beacon frame 118 according to the long duration beacon rate 314. Thus, each successive beacon frame 118 transmission is separated by a longer non-broadcast interval 308 than the one prior, until a terminal non-broadcast interval 308(2) is reached. The long duration beacon rate 314 may be operated, or intended to be operated, for instance, for a period of three minutes. Other operating time periods may also be used. Conservation of battery 108 energy or other concerns may drive the transition from the rapid beacon rate 312 to the long duration beacon rate 314.

Block 906 discontinues sending the beacon frame 118. In the present example, the communication module 104(1) discontinues sending the beacon frame 118 in response to timing out without successful communication with another device 102 or other entity. Such action may be taken so as to conserve energy, or according to other considerations.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A method performed by a hardware processor, the method comprising:
    activating a first mode;
    sending, while in the first mode, a first plurality of beacon frames at a first rate, each beacon frame of the first plurality of beacon frames including an identifier for a first network;
    receiving, using the first network, network access credentials indicative of security-related information corresponding to a second network;
    sending a second plurality of beacon frames at a second rate, after the network access credentials are received, wherein the second rate is less than the first rate;
    activating a second mode;
    while in the second mode, using the network access credentials to connect to the second network;
    after connecting to the second network, activating the first mode;
    while in the first mode, sending a message confirming successful use of the network access credentials to connect to the second network; and
    after the sending the message, discontinuing use of the first network.

2. The method of claim 1, wherein the network access credentials are received from a device, the method further comprising: using the first network to send the message to the device.

3. The method of claim 1, wherein the network access credentials are received from a device, the method further comprising: using the first network to send another message to the device indicative of a particular rate for sending a future beacon frame.

4. The method of claim 1, wherein the sending the second plurality of beacon frames at the second rate occurs prior to the activating the second mode.

5. The method of claim 1, wherein the sending the second plurality of beacon frames at the second rate stops before the activating the second mode.

6. The method of claim 1, further comprising:
    measuring wireless signal strengths of signals received on a plurality of respective channels;
    selecting one of the plurality of respective channels having a greatest wireless signal strength; and
    sending the first plurality of beacon frames at the first rate and the second plurality of beacon frames at the second rate on the selected channel.

7. The method of claim 1, wherein the sending the first plurality of beacon frames at the first rate and the second plurality of beacon frames at the second rate is performed in accordance with at least a portion of an 802.11 standard as promulgated by the Institute of Electrical and Electronics Engineers.

8. The method of claim 1, wherein the sending the first plurality of beacon frames at the first rate, the sending the second plurality of beacon frames at the second rate, and the connecting to the second network are performed using the same wireless channel.

9. The method of claim 1, further comprising:
determining, using the network access credentials, an access point to the second network; and
sending, to the access point, a request to connect to the second network.

10. The method of claim 1, further comprising: deactivating the first mode before activating the second mode.

11. The method of claim 1, wherein:
the first rate is activated in response to a user input.

12. A device, configured to:
operate a communication interface in an access point (AP) mode;
send, using the communication interface, at least a first beacon frame at a first rate for a first period of time, wherein the first beacon frame includes an identifier for a first wireless network;
establish, using the communication interface, a first network connection by way of the first wireless network with another device;
receive, from the another device, network access credentials indicative of security-related information for a second wireless network;
send, using the communication interface, at least a second beacon frame at a second rate for a second period of time, after receiving the network access credentials for the second wireless network, wherein the second rate is less than the first rate;
discontinue operation of the communication interface in the AP mode;
operate the communication interface in a station mode;
send a request to connect to the second wireless network using the network access credentials;
establish, using the communication interface, a second network connection by way of the second wireless network;
discontinue operation of the communication interface in the station mode;
operate the communication interface in the AP mode; and
send a message confirming successful use of the network access credentials to connect to the second wireless network.

13. The device of claim 12, further configured to:
monitor a plurality of wireless channels;
measure respective signal strengths for one or more wireless signals detected during the monitoring;
select a wireless channel of the plurality of wireless channels having a greatest measured signal strength; and
send, using the selected wireless channel, the at least first beacon frame at the first rate during the first period of time and the at least second beacon frame at the second rate during the second period of time.

14. A first device comprising a non-transitory computer-readable storage media including a program code, the program code configured to cause one or more hardware processors of the first device to:
activate a first mode of a communication module;
send, while in the first mode, a first plurality of beacon frames at a first rate;
receive, using a first network indicated by the first plurality of beacon frames, network access credentials indicative of security-related information corresponding to a second network;
send a second plurality of beacon frames at a second rate, after the network access credentials are received, wherein the second rate is less than the first rate;
activate a second mode of the communication module;
while in the second mode, use the network access credentials to connect to the second network;
activate the first mode of the communication module; and
while in the first mode, send a message confirming successful use of the network access credentials to connect to the second network.

15. The first device comprising the non-transitory computer-readable storage media of claim 14, wherein the sending the second plurality of beacon frames at the second rate stops before the activating the second mode of the communication module.

16. The first device comprising the non-transitory computer-readable storage media of claim 14, wherein the program code is further configured to cause the one or more hardware processors to:
monitor wireless communications on a plurality of channels;
determine values for one or more selection criteria, the selection criteria comprising at least one of:
received signal strength of wireless signals,
a count of the number of unique devices sending wireless signals, or
a quantity of traffic sent;
select one of the plurality of channels exhibiting a greatest value of the selection criteria;
transition the communication module to the first mode; and
send the first plurality of beacon frames at the first rate and the second plurality of beacon frames at the second rate using the selected channel.

17. The first device comprising the non-transitory computer-readable storage media of claim 16, wherein:
the received signal strength of wireless signals corresponds to wireless signals transmitted by a plurality of wireless access points operating on the plurality of channels,
the selection criteria comprises the received signal strength, and
the selected channel corresponds to a channel in use by a wireless access point of the plurality of wireless access points, the wireless access point providing a greatest received signal strength at the first device.

18. The first device comprising the non-transitory computer-readable storage media of claim 16, the program code is further configured to cause the one or more hardware processors to:
count a number of different wireless signals received on the monitored plurality of channels, wherein the quantity of traffic sent on a respective channel is defined by the count of different wireless signals received on the respective channel.

19. The device of claim 12, further configured to:
disconnect the first network connection with the another device;
discontinue operation of the communication interface in the AP mode;
operate the communication interface in the station mode; and resume communication using the second network connection.

* * * * *